W. A. Allen.
Sawing Mach.
No. 95,406. Patented Oct. 5, 1869.
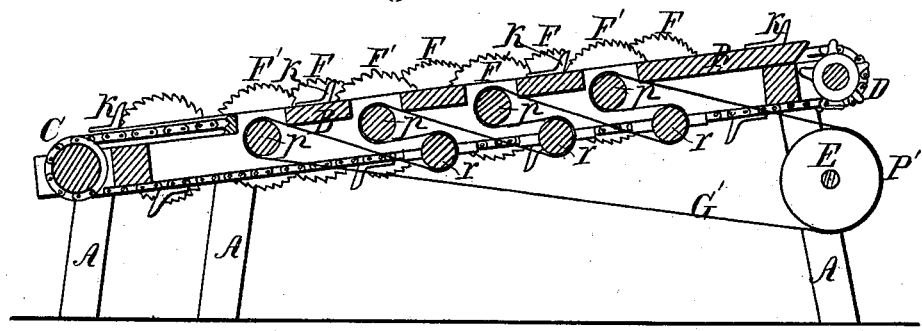
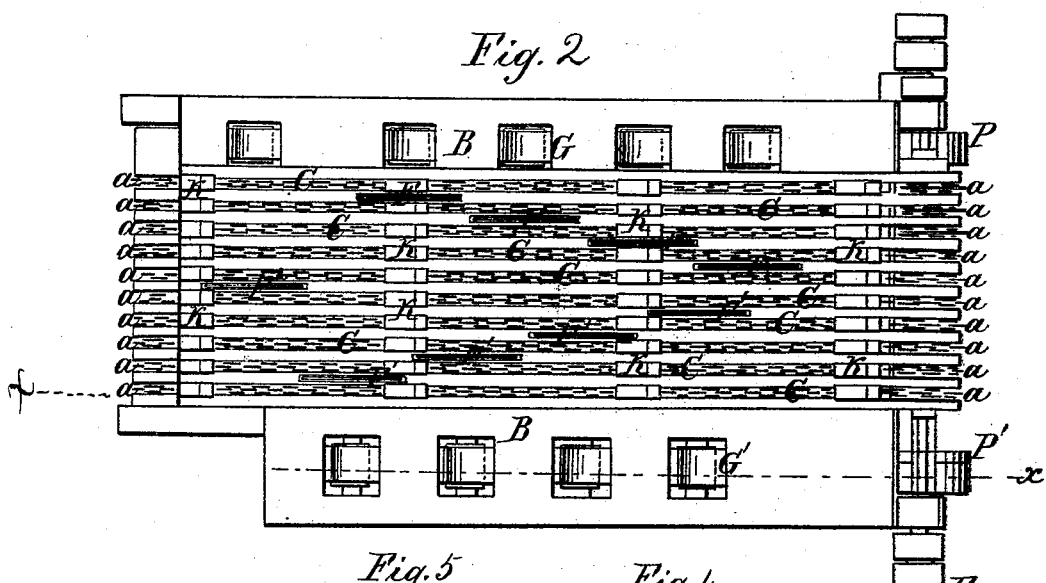
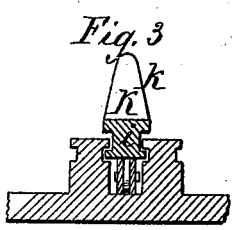
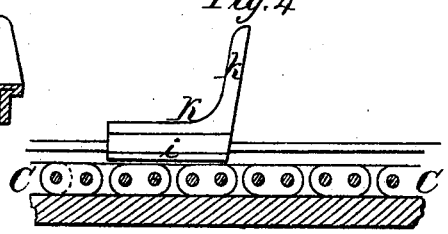
Witnesses
C. A. Pettit
S. C. Kenion
Inventor
W. A. Allen
by Keun H.
Attorneys

United States Patent Office.

W. A. ALLEN, OF BALTIMORE, MARYLAND.

Letters Patent No. 95,406, dated October 5, 1869.

IMPROVEMENT IN SAWING-MACHINE.

The Schedule referred to in these Letters Patent and making part of the same.

*To all whom it may concern:*

Be it known that I, W. A. ALLEN, of the city and county of Baltimore, and State of Maryland, have invented a new and improved Machine for Sawing Kindling-Wood; and I do hereby declare that the following is a full, clear, and exact description of the construction and operation of the same, reference being had to the accompanying drawings, making a part of this specification, in which—

Figure 1 is a longitudinal vertical section through line *x* of fig. 2.

Figure 2 is a top view.

This invention relates to that class of sawing-machines in which several circular saws are employed in connection with endless chains and knees for carrying the logs.

All such machines, heretofore constructed, have proved impracticable and useless where more than a single saw was employed. The defect has been that two or more of the saws were arranged either on one mandrel, or so that their axis of rotation came in the same line, and the log was fed to them in such a manner that the saws entered it at the same instant, and, as a consequence of this arrangement, if the log were crooked, or by any accident failed to present itself fairly to the two (or more) saws, it bound or wedged between them, and some part of the machinery had to give way.

The difficulty above referred to is entirely obviated in my improved machine, by two simple expedients, either of which, if employed alone, will produce the desired effect, but which, when both employed together, are believed to render the machine as perfect in this respect as possible.

One of these expedients consists in arranging the saws in two converging lines, but no two saws laterally opposite to each other, so that, while the saws attack the log near its two ends, and then successively cut it nearer and nearer its centre, sawing bolt after bolt from each end, yet, at any one time, only a single saw is engaged upon it; they being so arranged that first a saw strikes its right end and saws nearly or quite through, then another strikes its left end and saws nearly or quite through, after which a third strikes its shortened right end and saws a second bolt therefrom, and then a fourth strikes its shortened left end and saws a second bolt therefrom, this process being repeated till the whole log is cut up into short pieces.

The other of these two expedients consists in arranging a saw at the open end of the triangle formed by the two converging lines above referred to, in such a manner that it will cut the log in two pieces at or near its middle, before the other saws act upon it. After the log is thus cut in two, each part of it is carried along by the belts or carrier independently of the other part, and is thus applied to the saws. It is obvious that if the saws on one side of the machine are made to enter it successively, it cannot, by any possibility, "bind" between any two of them so as to break them.

In the drawings—

A is the frame of the machine.

B B, the inclined saw-table, having grooves, *a a a*, on each side of every saw.

C C, endless chains running in the grooves *a a*, so as to be countersunk in the surface of the table, and each supporting a series of forward-inclined knees K K, which, pushing against the log at different points, carry it along against the saws, and, after the bolts are cut off, carry them to the upper end of the machine and drop them into suitable receptacles, the whole being driven by a shaft, E, provided with spur-wheels, D D.

G G', belts, which, running over pulleys, *p p'*, on the mandrels, and idlers, *r r'*, below them, drive all the saws by means of power applied from large pulleys, P P'.

F F F, the saws on one side of the table, arranged in one of the converging lines referred to.

F¹ F¹ F¹, the saws arranged in the other converging line; and F², the single dividing-saw arranged at the open end of the triangle, for the purpose of cutting the log in two parts at the outset.

It is obvious that the log will first be divided by the saw F², after which the two pieces thereof will be carried along entirely independent of each other. Before they strike the next saw they will settle into position, or, as it is technically called, "settle upon their bearings," so that when the saw does touch them they will lie firmly in their respective places, and will not jump or be thrown from the table, as might otherwise be the case. If the saws are arranged so as to strike successively one part of the log and then the other, there can be no possibility of the log's binding between any two saws, for only one will act upon it at any one time; but if the saws are arranged in pairs on each mandrel, at opposite sides of the centre of the machine, so that at the same instant they strike the two divided parts of the log, still no "binding" can ensue, for the two ends of the log being separated from each other, the action of the saw upon one cannot cause the other to bind.

It is not absolutely necessary that the saws composing the different pairs should be arranged so obliquely with relation to each other, that one will have completely passed out of the log before the other shall strike it. It is, in fact, better that the opposite saw should "take" in it slightly before it leaves the other, but when it is so far severed that it cannot bind, for then the saws will prevent the log from working or sliding endwise, or laterally across the table in either direction, and the bolts will all be cut exactly of the same length.

One obvious advantage in not arranging all the saws upon a single mandrel, (besides the freedom from binding, &c.,) is in the fact that only power sufficient to drive one saw is at any time required.

Having thus described my invention,

What I claim as new, and desire to secure by Letters Patent, is—

1. In a sawing-machine having the table B, carriers C C, and knees K K, in connection with a set of saws F F¹, arranged in two converging lines, the dividing-saw F² arranged at the open end of the triangle formed by the two converging lines, substantially as and for the purpose specified.

2. In a sawing-machine having the table B, carriers C C, and knees K K, the arrangement of the saws F F¹, in two converging lines, with no two saws laterally opposite to each other, but each saw on one side of the table so disposed that it will cut into the log just after or just before a saw on the opposite side of the table, substantially as and for the purposes set forth.

3. In a sawing-machine having the table B, carriers C C, and knees K K, the arrangement of the saws in two converging lines, each pair of saws being obliquely disposed, as hereinabove set forth, together with the single saw F² at the open end of the converging lines, being the precise arrangement shown in fig. 2, substantially as and for the purpose described.

W. A. ALLEN.

Witnesses:
C. A. PETTIT,
SOLON C. KEMON.